United States Patent [19]

Nakatsu

[11] Patent Number: 5,108,163
[45] Date of Patent: Apr. 28, 1992

[54] APPARATUS FOR STORING ARTICLES

[76] Inventor: Naoshi Nakatsu, Kamizaimoku-cho 1743, Kanuma-shi, Tochigi-ken, Japan

[21] Appl. No.: 723,671

[22] Filed: Jun. 27, 1991

Related U.S. Application Data

[63] Continuation of Ser. No. 485,406, Feb. 27, 1990, abandoned.

[30] Foreign Application Priority Data

May 16, 1989 [JP] Japan ................................. 1-120407

[51] Int. Cl.⁵ ............................................. A47B 88/00
[52] U.S. Cl. .................................................. 312/268
[58] Field of Search ................... 312/268, 465.1, 465.3

[56] References Cited

U.S. PATENT DOCUMENTS

| | | | |
|---|---|---|---|
| 1,837,605 | 12/1931 | Baker | 198/465.3 |
| 2,600,869 | 6/1952 | Harkness et al. | 312/268 X |
| 2,881,041 | 4/1959 | Liebman | 312/268 X |
| 4,296,984 | 10/1981 | Lehman . | |
| 4,877,121 | 10/1989 | Yamashita et al. . | |

FOREIGN PATENT DOCUMENTS

| | | |
|---|---|---|
| 1173027 | 6/1964 | Fed. Rep. of Germany . |
| 2519143 | 11/1976 | Fed. Rep. of Germany . |
| 2542226 | 3/1977 | Fed. Rep. of Germany . |
| 360791 | 11/1931 | United Kingdom . |
| 1040429 | 8/1966 | United Kingdom . |
| 2143223 | 2/1985 | United Kingdom . |
| 2172881 | 10/1986 | United Kingdom . |

Primary Examiner—Joseph Falk
Attorney, Agent, or Firm—Armstrong, Nikaido, Marmelstein, Kubovcik & Murray

[57] ABSTRACT

According to this invention, a storage facility for articles is provided in a tower which is additionally established as a separate building adjacent to a house, permitting stored articles to be placed and removed in the tower from inside the house. According to the invention, there is provided an apparatus for storing articles therein having a tower which is connected to part of a house via an entrance provided adjacent to the outside of the house; endless chains are provided in the tower so that the chains run a vertical direction; a plurality of storage compartments are linked to the chains so that the storage compartments run together with the chains; and a motor for driving the chains is electrically controlled such that a desired storage compartment is selected and stopped at the entrance. The storage compartments have pins projectingly provided on both sides thereof wherein the pins are detachably linked to the chains, supporting the pins on complementary projections of the chains. A switching device is provided for separating the upwardly and downwardly moving compartments at their top and bottom end positions and for moving the compartments in a horizontal direction toward an opposite side of the endless chains, thereby supporting the compartments on the other side of the chains running in an opposite direction.

2 Claims, 5 Drawing Sheets

APPARATUS FOR STORING ARTICLES

This application is a continuation of application Ser. No. 485,406 filed Feb. 27, 1990, now abandoned.

BACKGROUND OF THE INVENTION

This invention relates to an apparatus for storing articles. In ordinary households, fixed storage facilities which are already built into the house, or separately purchased storage boxes or racks are used for storage of clothing and other household items. In such facilities, when the number of articles to be stored increases, or when storage space is insufficient, household items must be kept inside the house, decreasing the living space available and causing a considerable deterioration in the living environment.

SUMMARY OF THE INVENTION

The present invention eliminates the foregoing problems by providing a storage tower which is separate from a house. The storage tower provides a useful space for storing articles therein as well as for placing therein and removing therefrom articles from inside the house. According to the invention, as a means for solving the aforementioned problems, there is provided an apparatus for storing articles characterized in that: a tower which is connected to part of a house via an entrance is provided adjacent to the outside of the house; endless chains are provided in said tower so that the chains run in a vertical direction; a plurality of storage compartments are linked to the chains so that the storage compartments run together with the chains; a motor for driving the chains is electrically controlled such that a desired storage compartment is selected and stopped at the entrance. Additionally, the invention is characterized in that projecting pins provided on both sides of the storage compartments are detachably linked to the chains by supporting the projecting pins on complementary projections on the chains; and still further that, on the inside of the engaging ends of the chains, a switching device is provided for separating the upwardly and downwardly moving storage compartments from the individual chains at the top and the bottom end positions thereof for moving the compartments horizontally so that they are supported on the other side of each of the chains which run in the opposite direction.

In order to effect the operation of the apparatus according to the present invention, the invention further comprises a tower in which various articles are stored in the storage compartments which in turn are linked to the endless chains. When the articles are required, the chains are moved by operating a control panel for controlling a chian drive motor from inside a house. A desired storage compartment is stopped at the entrance of the house and articles are placed in or are removed from the storage compartment from inside the house.

In the foregoing apparatus, the storage compartments are supported on projections provided on the internal side of the loop of the chains by means of pins which project from both sides of the storage compartments. It is therefore always possible to easily detach and attach the storage compartments to the chains. Further, by means of this detachable relationship of the chains and the storage compartments, the highest and lowest storage compartments can be moved in a horizontal direction and switched by a switching device to the other side of the chains which are running in the opposite direction before they reach the highest point or the lowest point of the endless chain facility. This permits the storage compartments to change direction within a small restricted area. More specifically, according to conventional practices, in order to rotate storage compartments linked to chains in a half-circle track to change direction at the upper and the lower ends of the chains, each of the storage compartments must be linked to the chains at rather wide vertical intervals. Therefore the number of storage compartments which can be provided within a limited height and space of the tower is limited and their total number decreased. However, in the present invention the direction of the moving compartments is changed to a horizontal direction immediately before the storage compartments reach the direction change terminal of the chains to move them to the other side of the chains. Therefore, a wide area is not required for the directional change, and further, a greater number of storage compartments can be connected to the chains with very limited clearance between the adjoining storage compartments in the vertical direction.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

An embodiment of the present invention will now be explained with reference to the attached drawings.

Figure 1:
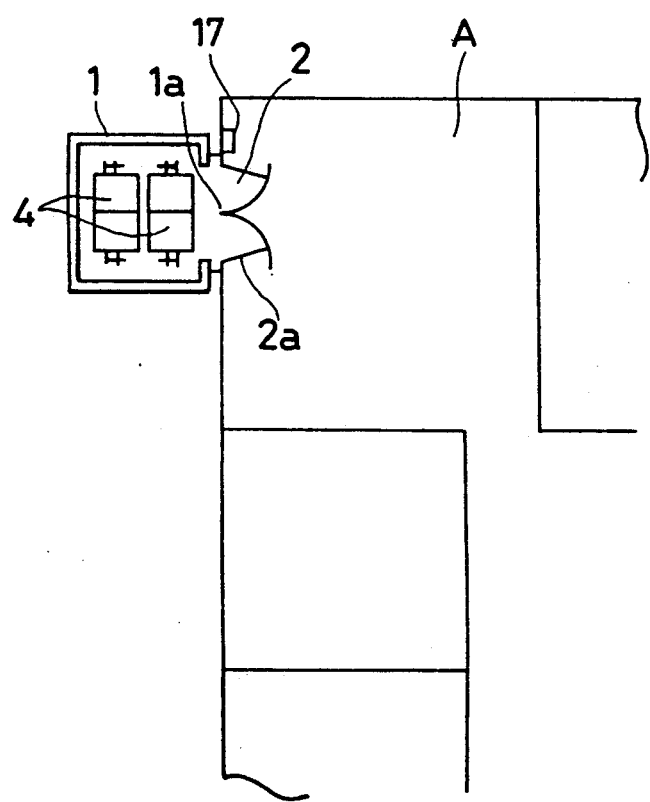
FIG. 1 is a top plan view of an embodiment of the present invention, shown in its entirety.

In the drawings, reference character A indicates a house of any optional construction. When the number of occupants of the house or the number of household articles increases, resulting in an inconvenience of insufficient storage space for the articles with existing facilities inside the house, an entrance 2 to part of the house A is provided and a tower 1 linked to the house A via the entrance 2 is constructed as shown in FIG. 1.

The entrance 2 should preferably have a door 2a which can be opened and closed at any time.

In the tower 1 a pair of left and right chains 3 is hung to upper and lower chain wheels 3a, 3a, 3b and 3b. The lower chain wheel 3b is driven by a geared motor 5, and said driven chain wheel 3b is connected on the same axis with the lower chain wheel 3b on the other side thereof so that the chains 3 on both sides move at the same speed in upward and downward directions in an endless circle. Projections 6 are provided at fixed intervals on the inside of the respective chains 3. Storage compartments 4 are detachably linked to the chains 3 across the projections 6 so that pins 7 which project on both sides of the storage compartments 4 are supported on the projections 6. Although in the illustrated embodiment, a large number of storage compartments 4 are placed on top of each other, interconnecting them almost without any vertical interval therebetween, the compartments can be spaced at any optional interval. By decreasing the interval between them, the number of compartments 4 is increased.

While in the illustrated embodiment the running direction of the chains 3 moves the storage compartments 4 from top to bottom on the entrance side 2, the running direction may be reversed. Furthermore, the motor 5 may be a reversible motor so that when removing or replacing articles as described below, a selected storage compartment 4 may be moved from its stopped position to the entrance 2 in the shortest amount of movement.

The storage compartments 4 are shown as having a box shape with one surface which opens toward the entrance 2, and five other closed surfaces, with the inside of the box being divided into four compartments by vertical and horizontal plates. Each compartment contains a drawer 4a which is inserted so that it can be pulled in and out for storage of articles. However the storage compartments may be of any optional construction. For example, instead of employing drawers 4a, a construction may be employed in which an opening and closing door is provided in the opening surface of the storage compartment so that articles can be stored directly inside the box-shaped storage compartment. Alternatively, instead of employing a box shape, a frame may be employed in which the drawers 4a can be pulled in and out. In the figures, reference characters 4c denote metal handles for the drawers.

Switching devices 8 and 8' for the storage compartments 4 are provided on the inside of the tower 1 relative to the top and bottom ends of engagement of chains 3 and on the outside of each of the right and left pair of chains 3, the switching devices being positioned mutually opposite to each other.

Figure 4:
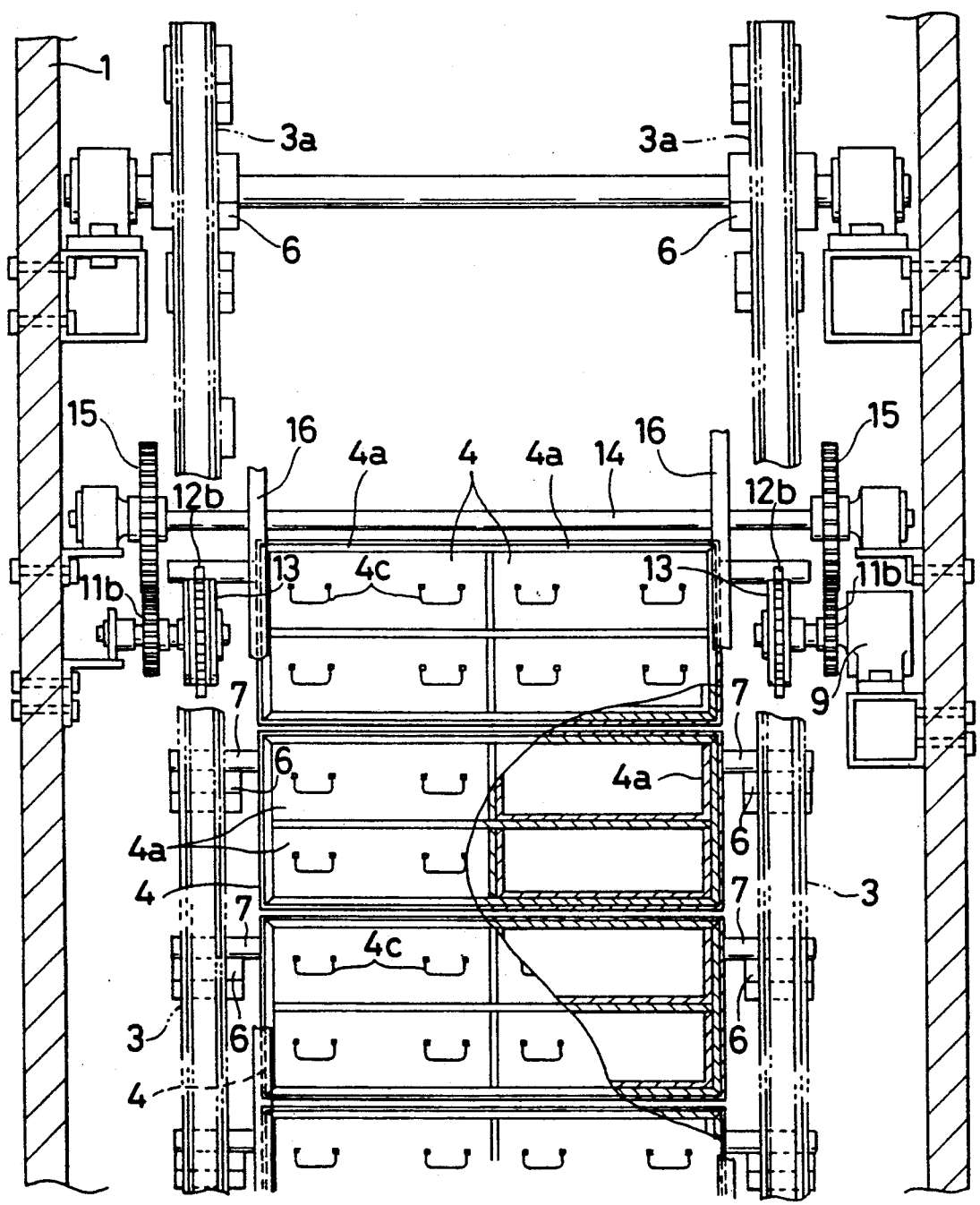
FIG. 4 is a front view of the same.
Figure 5:
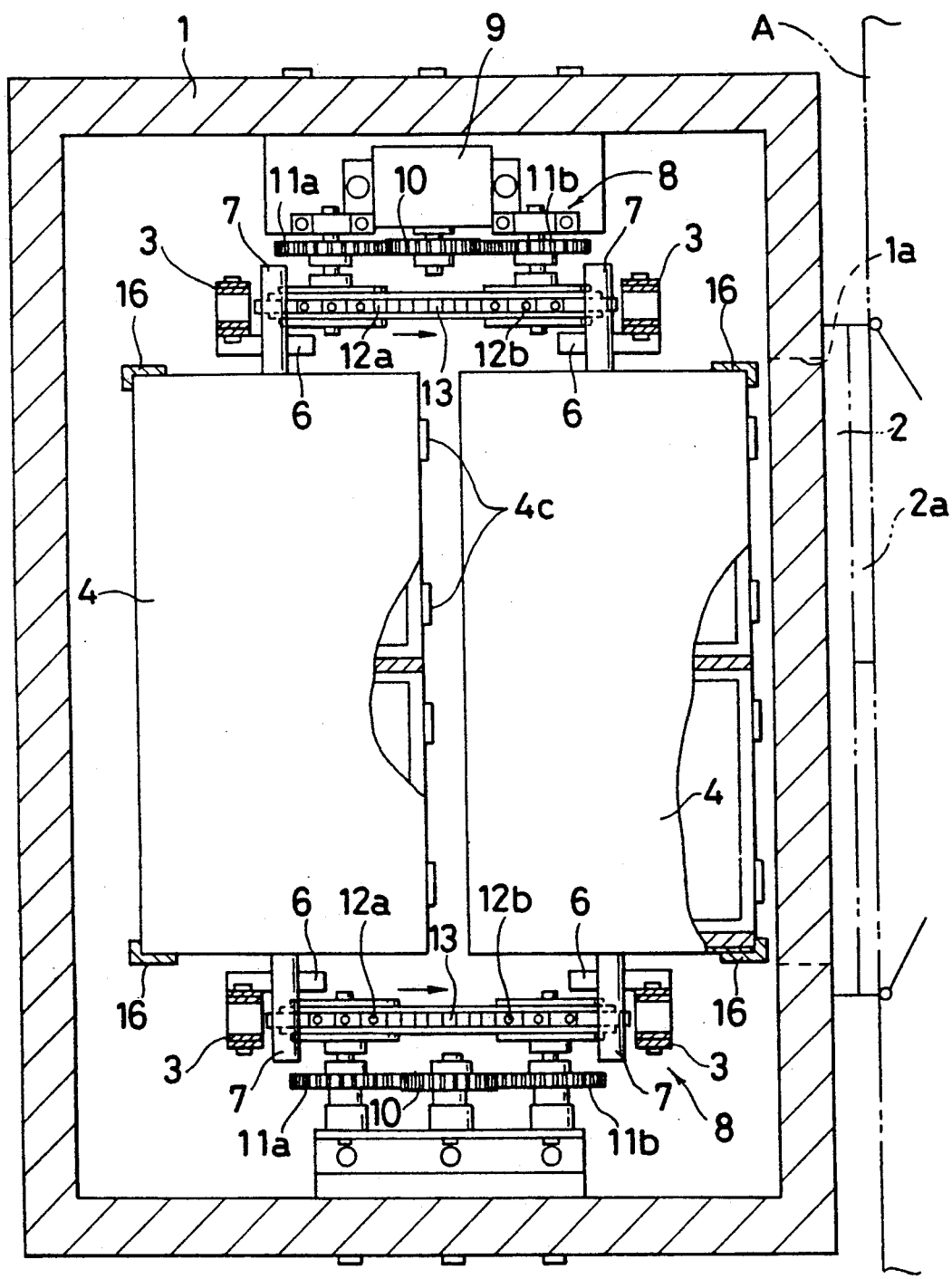
FIG. 5 is a sectional plan view taken along the line V—V in FIG. 3.

As shown in FIGS. 4 and 5, the switching devices 8, which are mutually opposed to each other at the top of the tower 1, are constructed so that individual driven gears 11a, 11b are linked on both sides of a gear 10 which is driven by a motor 9 installed on one side of the inside of the tower 1. Chain wheels 12a and 12b with long tips are fixed on the axes of the driven gears 11a, 11b on both sides thereof, and are provided with a transport chain 13 disposed between chain wheels 12a and 12b. The chain wheels 12a, 12b are provided in a position in which the pins 7 which protrude on both sides of the storage compartments 4 can be held between the tips of the chain wheels 12a, 12b.

Interconnected gears 15 are fixed on both ends of an axial rod 14 which is rotatably supported on both sides thereof. By engaging the interconnected gears with the driving gears 10 which are disposed on both sides of tower 1, one gear 10 may be driven with the motor 9 which is provided on one side only of the tower 1, thus causing power to be transmitted to the other gear 10 on the other side of the tower 1 via interconnected gears 15.

Figure 2:
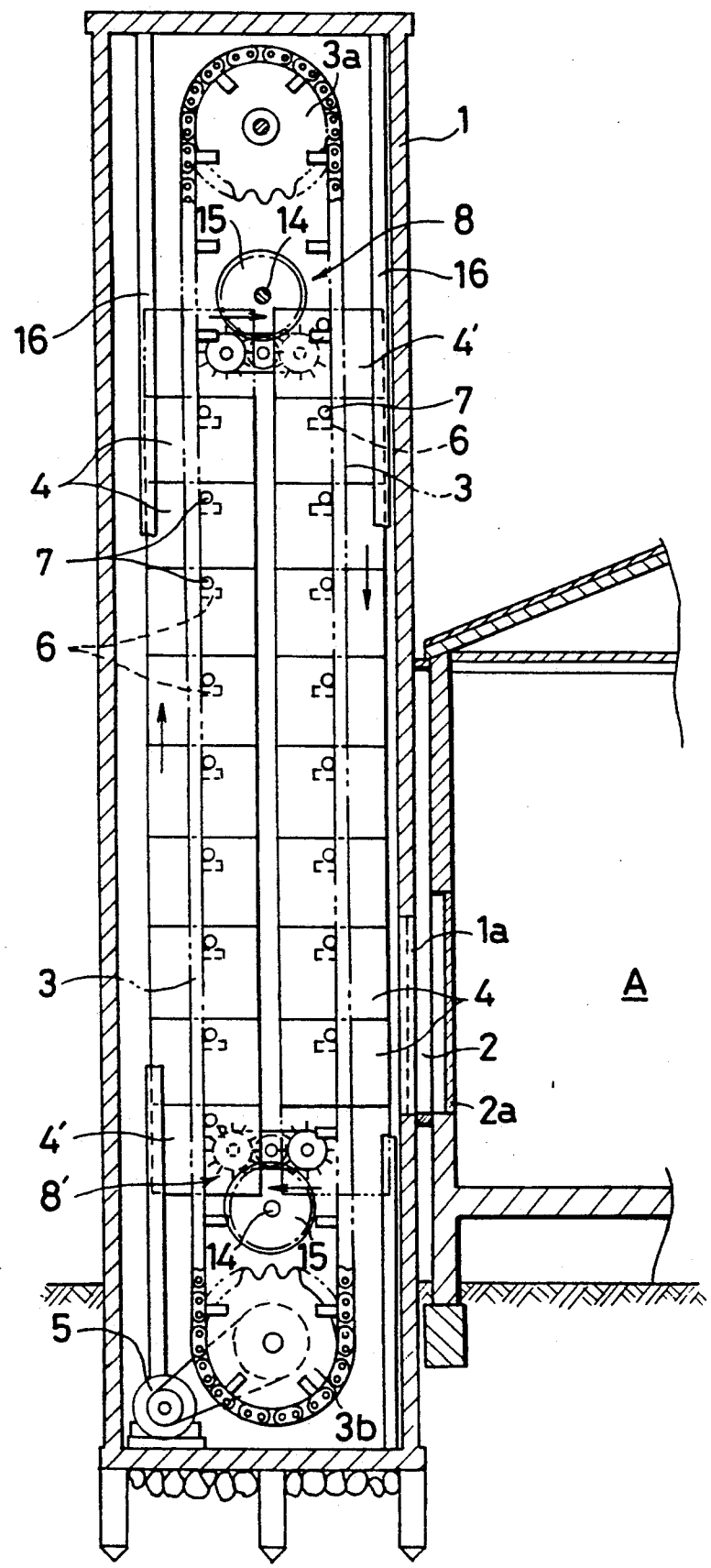
FIG. 2 is a sectional side view of an important portion of the embodiment shown in FIG. 1.

Further, the lower switching device 8' is constructed identically to the one described above, with the exception that the chain wheels 12a, 12b and the transport chain 13 rotate in the opposite direction to the upper switching device 8, as shown in FIG. 2.

Figure 3:
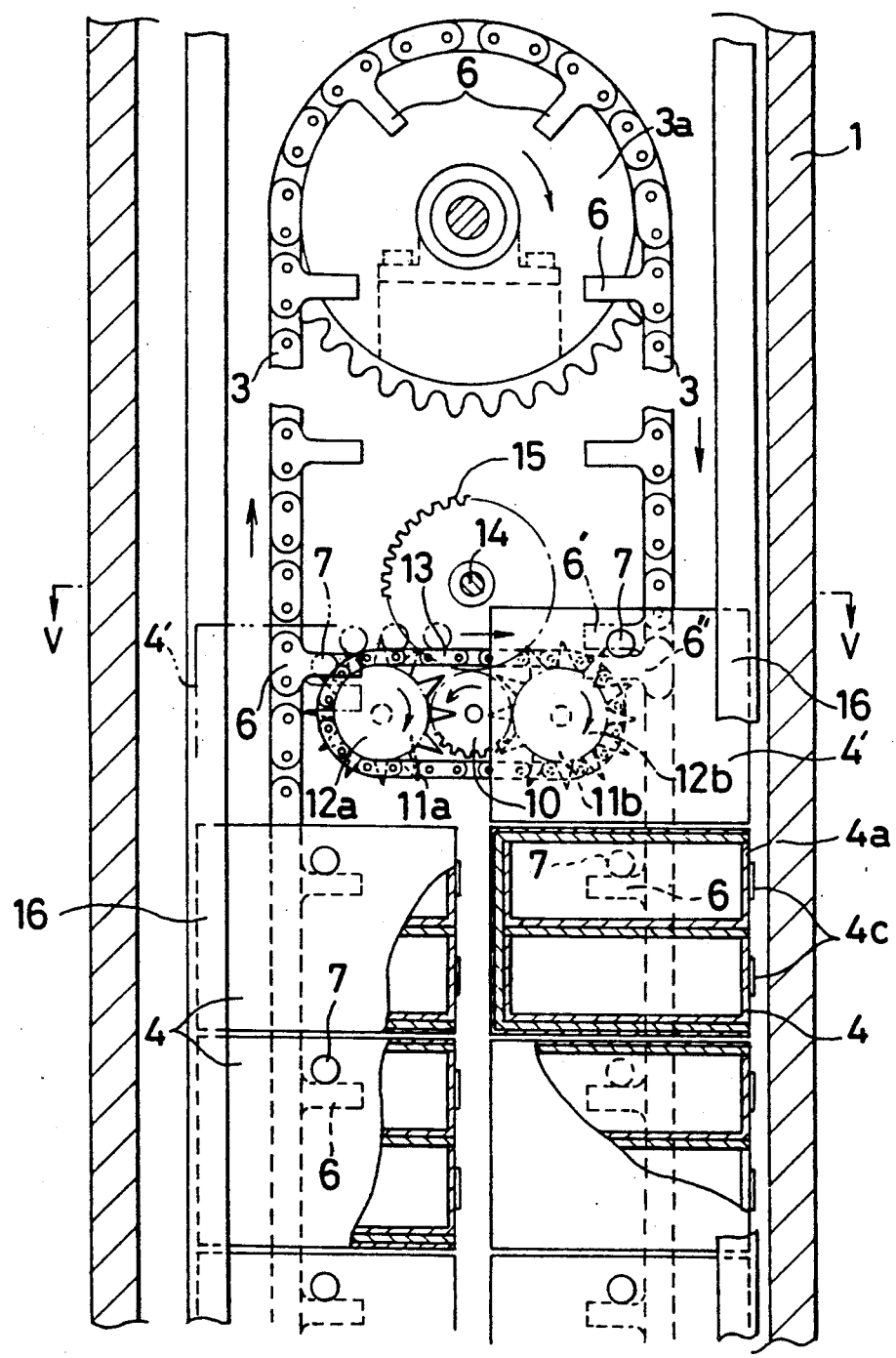
FIG. 3 is an enlarged sectional view of an upper portion of the tower.

The operation of the upper switching device 8 is explained in relation to FIG. 3, wherein the upper chain wheel 3a rotates in the direction of the arrow, and therefore the storage compartments 4 are moved upwards on the left-hand side of the chain and downwards on the right-hand side of the chain. When a storage compartment 4 at the top left-hand end moves upwards, and immediately before it reaches its upper limit in the tower 1, the motor 9 is initiated. With the consequent rotation of gears 10, 11a and 11b in the direction of the arrows, the chain wheels 12a, 12b on both sides also rotate in the same direction and at the same speed. The pins 7 on both sides of the storage compartment 4' reaching the upper limit are picked up between the tips of the chain wheel 12a as the storage compartment 4' reaches its upper limit. By moving the pins 7 onto the transport chain 13, the storage compartment 4' is moved horizontally to the other side of the tower 1 by the movement of the chain 13. During that time the projection 6' on the other side of the chain 3 which is moving downwards moves from the position as shown by imaginary lines to the position 6'' as shown by broken lines. The pin 7 sent by the transport chain 13 is carried onto the projection 6' shown by broken line, and the storage compartment 4' is switched from the left-hand side of the chain 3 to the right-hand side and changes in its direction so as to move downwards.

The above operation is identical for the lower switching device 8', so that, as shown in FIG. 2, the storage compartment 4' which is proceeding towards its lowest position is switched from the right-hand side of the chain 3 to the left-hand side thereof. The storage compartments 4' are thus moved circularly, and in upward and downward directions, wherein the storage compartments 4' change direction in a minimal space through horizontal movement.

In the illustrated embodiment, two storage compartments 4 are positioned at the opening of the entrance 2, but this may be changed to one storage compartment without any effect, and furthermore the number of compartments may be increased or decreased at will. An entrance 1a may be provided in the tower 1 opposite the entrance 2 and an opening and closing door to the entrance 1a may be provided as necessary.

In the above storing apparatus a control panel 17 is located inside the house A. Through its operation by a known electrical means, one of the many storage compartments 4 may be selected for removal or placing of articles therein. If a corresponding button is pressed, the motor 5 may be activated to move the selected storage compartment to a position facing the entrance 2, and stop it there, regardless of its previous stopped position. In this case, as described above, by making the chain drive motor 5 a reversible type motor, the selected storage compartment can be positioned at the entrance 2 in the shortest possible distance of movement.

Further, the right and left chains 3 for transport of the storage compartments 4 are moved intermittently such that, after moving the positioning interval by one pitch of the storage compartment, they stop for three seconds, for example. The upper and lower switching devices 8 and 8' may be moved simultaneously by starting the chains 3 at approximately the same speed, or they may be continuously operated, permitting the switching operation of the storage compartments 4 to be carried out while the chain is stopped for three seconds. Furthermore, to prevent any deviation during the upward and downward movements of the storage compartments 4, the storage compartments 4 are moved up and down by aligning both sides thereof along guide edges 16.

As can be fully understood from the description above, the present invention has the important effect of enabling a storage facility for articles provided in a tower which is additionally established as a separate building adjacent to a house, permitting stored articles to be placed and removed in the tower from inside the house. Accordingly, it has a number of advantages in that it can be conveniently used as a storage facility when the house is cramped due to an increase in the number of household articles or people living therein; it provides a large number of storage compartments in a relatively small space because of the use of endless chains to move the article storage compartments up and down within the tower; and further, operation is very convenient in that any desired storage compartment can be moved to and stopped at the entrance; and because it is separate from the house and thus is not subjected to damage such as from fire and water, it provides an easy and safe method of storing articles.

It is readily apparent that the above-described storage facility meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for storing articles comprising:
   a tower which is connected to part of a house via an entrance provided adjacent to the outside of the house;
   a plurality of endless chains disposed parallel to each other and provided in said tower so that said chains run in a vertical direction, each of said endless chains defining a respective closed loop, said closed loops being parallel to each other;
   a plurality of storage compartments linked to said chains so that said storage compartments run up and down together with said chains;
   a motor for driving said chains, said motor being electrically controlled such that a desired storage compartment is selected and stopped at the entrance; and
   switching devices disposed adjacent respective ends of engagement of said chains, wherein said switching devices are disposed inside of said closed loops defined by said chains, said switching devices comprising means for separating the upwardly and downwardly moving storage compartments at the top and the bottom end positions from the endless chains and said closed loops and means for moving said storage compartments in a horizontal direction from one side of said endless chains to another side thereof so that they are supported on the other side of said chains which run in an opposite direction to said one side, wherein each of said switching devices comprises a driving gear and driven gears disposed on respective sides of said driving gear, chain wheels disposed coaxially with said driven gears, and a horizontally disposed transport chain disposed around said chain wheels, said storage compartments being transported on said transport chain from said one side of said endless chains to said other side thereof.

2. The apparatus as claimed in claim 1 further comprising pins projectingly provided on both sides of said storage compartments and being detachably linked to said chains by supporting said pins on projections of said chains.

* * * * *